US011794418B2

(12) United States Patent
Traidia et al.

(10) Patent No.: US 11,794,418 B2
(45) Date of Patent: Oct. 24, 2023

(54) APPARATUS AND METHOD FOR THREADED-WELDED REINFORCED THERMOSETTING RESIN PIPE JOINTS

(71) Applicant: SAUDI ARABIAN OIL COMPANY, Dhahran (SA)

(72) Inventors: Abderrazak Traidia, Lussan (FR); Abdullah Al Shahrani, Dammam (SA); Waleed Al Nasser, Ad Dammam (SA); Chris Worrall, Cambridge (GB); Farshad Salamat-Zadeh, Cambridge (GB)

(73) Assignees: SAUDI ARABIAN OIL COMPANY, Dhahran (SA); SAUDI ARAMCO TECHNOLOGIES COMPANY, Dhahran (SA)

( * ) Notice: Subject to any disclaimer, the term of this patent is extended or adjusted under 35 U.S.C. 154(b) by 0 days.

(21) Appl. No.: 17/380,748

(22) Filed: Jul. 20, 2021

(65) Prior Publication Data
US 2022/0016851 A1    Jan. 20, 2022

Related U.S. Application Data (60) Provisional application No. 63/053,926, filed on Jul. 20, 2020.

(51) Int. Cl.
*B29C 65/36* (2006.01)
*B29C 65/34* (2006.01)
(Continued)

(52) U.S. Cl.
CPC ...... *B29C 65/3696* (2013.01); *B29C 65/3452* (2013.01); *B29C 66/1122* (2013.01);
(Continued)

(58) Field of Classification Search
CPC ............ B29C 65/3696; B29C 65/3452; B29C 66/1122; B29C 66/71; B29C 66/73921; B29C 66/5221; F16L 47/02; F16L 47/16
See application file for complete search history.

(56) References Cited

U.S. PATENT DOCUMENTS 170,473 A     11/1875  Flagler et al.
2,559,806 A *  7/1951  Thompson ............ F16L 15/008
                                                411/257
(Continued)

FOREIGN PATENT DOCUMENTS

CA     2116083 A1   8/1994
CN     1086763 A    5/1994
(Continued)

OTHER PUBLICATIONS

Van Moorleghem, Régis, "Welding of thermoplastic to thermoset composites through a thermoplastic interlayer"; TUDelft: Delft University of Technology; Jun. 2, 2016; <http://resolver.tudelft.nl/uuid:821d5aaf-99a8-4fc7-a32d-eadb5d104aa9>; Accessed Jun. 16, 2020 (67 pages).

(Continued)

*Primary Examiner* — Daniel McNally
(74) *Attorney, Agent, or Firm* — Osha Bergman Watanabe & Burton LLP (57) ABSTRACT

A system for coupling pipes includes a first pipe having a tapered, spigot end; a second pipe having a tapered, spigot end; wherein the first pipe and the second pipe are made from a reinforced thermosetting resin (RTR), and a coupler having two tapered socket ends adapted to internally receive the respective tapered, spigot ends of the first pipe and the second pipe, wherein a thermoplastic material is disposed between an exterior of the first pipe and an interior of the (Continued)

coupler. A thermoplastic material is disposed between an exterior of the second pipe and the interior of the coupler. Upon application of induction heating to the coupler, the heat between the first pipe, the second pipe, and the coupler is sufficient to melt the thermoplastic material such that, when the heat is removed, the hardened thermoplastic material seals the first pipe and the second pipe to the coupler. A system for coupling pipes includes a first pipe having a tapered, spigot end; and a second pipe having a tapered, socket end adapted to internally receive the tapered, spigot end of the first pipe. The first pipe and the second pipe are made from a reinforced thermosetting resin (RTR). A thermoplastic material is disposed between an exterior of the first pipe and an interior of the second pipe. Upon application of induction heating to the coupler, the heat between the first pipe and the second pipe is sufficient to melt the thermoplastic material such that, when the heat is removed, the hardened thermoplastic material seals the first pipe to the second pipe. A method includes disposing a thermoplastic material between an exterior of a first pipe and an interior of a coupler; disposing a thermoplastic material between an exterior of a second and an interior of the coupler; inserting the first pipe and the second pipe into the coupler; and applying induction heating to the coupler sufficient to melt the thermoplastic material such that, when the heat is removed, the hardened thermoplastic material seals the first pipe and the second pipe to the coupler. A method of coupling pipes includes disposing a thermoplastic material between an exterior of a first pipe and an interior of a second pipe; inserting the first pipe into the second pipe; and applying induction heating to the coupler sufficient to melt the thermoplastic material such that, when the heat is removed, the hardened thermoplastic material seals the first pipe to the second pipe.

10 Claims, 7 Drawing Sheets

(51) Int. Cl.
  B29C 65/00 (2006.01)
  F16L 47/02 (2006.01)
  F16L 47/16 (2006.01)
  B29K 105/06 (2006.01)
  B29L 23/00 (2006.01)
(52) U.S. Cl.
  CPC .......... *B29C 66/5221* (2013.01); *B29C 66/71* (2013.01); *B29C 66/73921* (2013.01); *F16L 47/02* (2013.01); *F16L 47/16* (2013.01); *B29K 2105/06* (2013.01); *B29L 2023/22* (2013.01)

(56) References Cited

U.S. PATENT DOCUMENTS

| | | | |
|---|---|---|---|
| 2,958,906 A | | 11/1960 | Youthed |
| 3,002,871 A | | 10/1961 | Tramm et al. |
| 3,061,503 A | | 10/1962 | Gould et al. |
| 3,307,997 A | | 3/1967 | Detrick |
| 3,506,519 A | | 4/1970 | Blumenkranz |
| 3,946,761 A | | 3/1976 | Thompson et al. |
| 4,090,899 A | * | 5/1978 | Reich ................ B29C 66/112 285/21.2 |
| 4,530,521 A | | 7/1985 | Nyffeler et al. |
| 4,662,655 A | | 5/1987 | Fliervoet et al. |
| 4,865,674 A | | 9/1989 | Durkin |
| 5,106,130 A | | 4/1992 | Ellsworth et al. |
| 5,152,855 A | | 10/1992 | Jansman et al. |
| 5,186,500 A | | 2/1993 | Folkers |
| 5,213,379 A | | 5/1993 | Taniguchi et al. |
| 5,264,059 A | | 11/1993 | Jacaruso et al. |
| 5,758,731 A | | 6/1998 | Zollinger |
| 5,785,092 A | | 7/1998 | Friedrich et al. |
| 6,131,954 A | | 10/2000 | Campbell |
| 6,521,072 B1 | | 2/2003 | Campbell |
| 7,240,697 B2 | | 7/2007 | Beebe et al. |
| 8,424,924 B2 | | 4/2013 | LaMarca et al. |
| 8,522,827 B2 | | 9/2013 | Lazzara et al. |
| 8,746,747 B2 | | 6/2014 | McPherson |
| 9,285,063 B2 | | 3/2016 | Jones |
| 9,358,764 B2 | | 6/2016 | Prebil et al. |
| 9,523,447 B2 | | 12/2016 | Conrad |
| 9,528,638 B2 | | 12/2016 | Hooberman |
| 9,534,719 B2 | | 1/2017 | Eccleston et al. |
| 9,810,359 B2 | | 11/2017 | Spears et al. |
| 2004/0222627 A1 | | 11/2004 | Krah |
| 2006/0279084 A1 | | 12/2006 | Collins |
| 2009/0277579 A1 | * | 11/2009 | Marelli ............... B29C 66/5344 156/293 |
| 2013/0036604 A1 | | 2/2013 | Schmidt et al. |
| 2013/0140811 A1 | | 6/2013 | Fahrer et al. |
| 2013/0175797 A1 | | 7/2013 | Kanao |
| 2014/0137971 A1 | | 5/2014 | Lundman |
| 2014/0220356 A1 | | 8/2014 | Van Tooren |
| 2014/0363220 A1 | | 12/2014 | Auer et al. |
| 2014/0375047 A1 | | 12/2014 | Jones |
| 2019/0128458 A1 | | 5/2019 | Kimball et al. |

FOREIGN PATENT DOCUMENTS

| | | | |
|---|---|---|---|
| CN | 1263977 C | 7/2006 | |
| CN | 104708890 B | 12/2018 | |
| CN | 110131511 A | 8/2019 | |
| CN | 110823481 A | 2/2020 | |
| DE | 939719 C | 3/1956 | |
| DE | 199 11 284 A1 | 9/2000 | |
| EP | 0382593 A2 | 8/1990 | |
| EP | 3717736 B1 | 3/2022 | |
| GB | 775233 A | 5/1957 | |
| GB | 1 329 364 A | 9/1973 | |
| GB | 2033394 A | * 5/1980 | ......... B29C 65/0627 |
| GB | 2033394 A | 5/1980 | |
| GB | 2 271 958 A | 5/1994 | |
| GB | 2425337 A | * 10/2006 | ........... B29C 65/342 |
| JP | H10-281383 A | 10/1998 | |
| JP | 2002-295780 A | 10/2002 | |
| JP | 2003-130276 A | 5/2003 | |
| JP | 2009018576 A | 1/2009 | |
| WO | 96/26380 A1 | 8/1996 | |
| WO | 00/55538 A1 | 9/2000 | |
| WO | 2005025836 A1 | 3/2005 | |
| WO | 2008028224 A1 | 3/2008 | |
| WO | 2009/007537 A1 | 1/2009 | |
| WO | 2010033163 A2 | 3/2010 | |
| WO | 2012137197 A2 | 10/2012 | |
| WO | 2020/007924 A1 | 1/2020 | |

OTHER PUBLICATIONS

Villegas, Irene Fernandez et al., "Ultrasonic welding of carbon/epoxy and carbon/PEEK composites through a PEI thermoplastic coupling layer"; Composites Part A: Applied Science and Manufacturing; vol. 109; pp. 75-83; Jun. 2018; <https://doi.org/10.1016/j.compositesa.2018.02.022> (32 pages).

Hamade, Ramsey F. et al., "Rotary Friction Welding versus Fusion Butt Welding of Plastic Pipes—Feasibility and Energy Perspective"; Procedia Manufacturing; vol. 33; pp. 693-700; 2019 (8 pages).

Beiss, T. et al., "Vibration Joining of Fiber-Reinforced Termosets"; Polymer COMPOSITES; vol. 31, Issue 7; pp. 1205-1212; Jul. 2010 (8 pages).

Yousefpour, Ali et al., "Fusion Bonding/Welding of Thermoplastic Composites"; Journal of Thermoplastic Compostie Materials; vol. 17; Issue 4; pp. 303-341; Jul. 2004 (39 pages).

Dell'Anna, Riccardo et al., "Lay-Up and Consolidation of a Composite Pipe by In Situ Ultrasonic Welding of a Thermoplastic Matrix (56) References Cited

OTHER PUBLICATIONS

Composite Tape"; MDPI Open Access Journals: Minerals; vol. 11, Issue 5: 786; pp. 1-11; May 11, 2018 (11 pages).
International Search Report and Written Opinion of the International Searching Authority issued in corresponding International Application No. PCT/US2021/042308, dated Oct. 15, 2021 (14 pages).
International Search Report and Written Opinion of the International Searching Authority issued in corresponding International Application No. PCT/US2021/042296, dated Oct. 14, 2021 (14 pages).
International Search Report and Written Opinion of the International Searching Authority issued in corresponding International Application No. PCT/US2021/042330, dated Oct. 15, 2021 (24 pages).
Ageorges, C., et al. "Advances in fusion bonding techniques for joining thermoplastic matrix composites: a review", Composites Part A: Applied Science and Manufacturing. Elsevier, vol. 32, No. 6. Jun. 1, 2001, pp. 839-857, [19 Pages].
Hou, Meng. "Thermoplastic Adhesive for Thermosetting Composites", Materials Science Forum vols. 706-709. Jan. 3, 2012, pp. 2968-2973, [7 Pages].
Nomura, H., et al. "Linear Vibration Welding of Polyethylene Pipes", In Proceedings of the 10th Plastic Pipes, Plastic Pipes Conference Association, Gothenburg, Sweden. Sep. 1998, pp. 669-678, [10 Pages].
Troughton, et al. "Linear Vibration Welding of Polyethylene Pipes", In Proceedings of the 10th Plastic Pipes, Plastic Pipes Conference Association, Gothenburg, Sweden. Sep. 1998, pp. 424-432, [9 Pages].
O. Schieler et al., "Induction Welding of Hybrid Thermoplastic-thermoset Composite Parts", KMUTNB Int J Appl Sci Technol., 2016, vol. 9, No. 1, pp. 27-36 (10 pages).

\* cited by examiner

APPARATUS AND METHOD FOR THREADED-WELDED REINFORCED THERMOSETTING RESIN PIPE JOINTS

BACKGROUND OF INVENTION

RTR (Reinforced Thermosetting Resin) pipe is an acronym given to a broad family of fiber reinforced thermosetting pipes manufactured via a filament winding process. The reinforcement is generally glass fiber and the resin (matrix) is a thermoset polymer, traditionally polyester, vinyl-ester, or epoxy depending on the nature of the transported fluids in the pipe and the service temperature. This has led to the development of 3 main product lines for RTR pipes; GRP (Glass Reinforced Polyester), GRV (Glass Reinforced Vinylester) and GRE (Glass Reinforced Epoxy) pipes.

RTR pipes are generally produced in rigid segments of about 10-12 meters in length and transported onsite before being eventually assembled (jointed) to each other to the required length. The historical development of RTR began with the need to replace heavy concrete and steel pipes used in utilities and potable/sewage water systems. However, the use of RTR pipes in higher value applications such as oil and gas (O&G) service (particularly GRE), has gained a great deal of attention and acceptance. Currently, thousands of kilometers of RTR pipes are installed globally (particularly in the Middle East region) on yearly basis to meet the need of critical applications such as high pressure water injection and sour crude oil flowlines. The experience of O&G operators over the last decades has shown that RTR is a mature technology and can be an economical alternative to traditional carbon steel pipes, particularly in view of the fact that RTR pipe is not subject to the same corrosion seen in carbon steel piping. Depending on the manufacturer's product portfolio, RTR line pipes are generally available in diameters ranging from 1½" to 44" and can be designed to handle pressures ranging from 150 psi to 4000 psi and temperatures up to 210° F.

Within the RTR pipe manufacturing industry is well-known that the joint/connection in an RTR pipeline system is often the limiting component towards a higher temperature and pressure operating envelope. The envelope is often defined in terms of the product pressure in view of the diameter (i.e., larger diameter RTR pipe generally cannot handle the same pressure as smaller diameter piping). Indeed, the experience of O&G operators has shown that most failures/leaks in RTR pipe systems are associated with joint failures. This could potentially reduce the confidence in the material and technology.

A number of proprietary joint designs have been developed over the years by the manufacturers, which can generally be grouped into two main types/categories; adhesive/bonded joints and interference joints. The former, adhesive/bonded joints, relies on an adhesive (or a laminate in case of wrapped/laminated joints) to transfer the load from one pipe to another and the performance/limitation of such joints is often associated with proper surface preparation, particularly in field conditions. The latter, interference joints, relies on a solid contact and direct load transfer between the two RTR pipes to be jointed, such as threaded and key-lock joints. A combination of both techniques (i.e, adhesive and interference) is also possible (e.g., the Injected Mechanical Joint—IMJ).

Figure 1A:
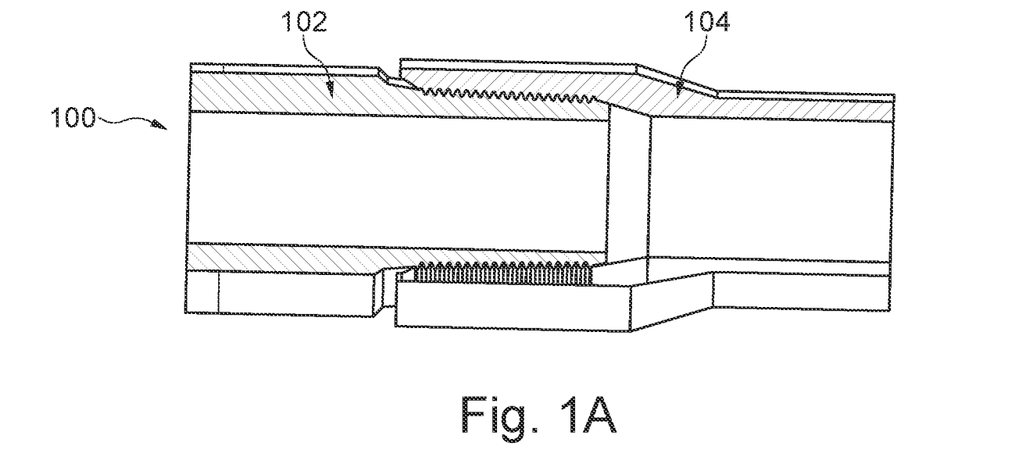
FIGS. 1A and 1B show an integral and a coupled threaded joint, respectively.
Figure 1B:
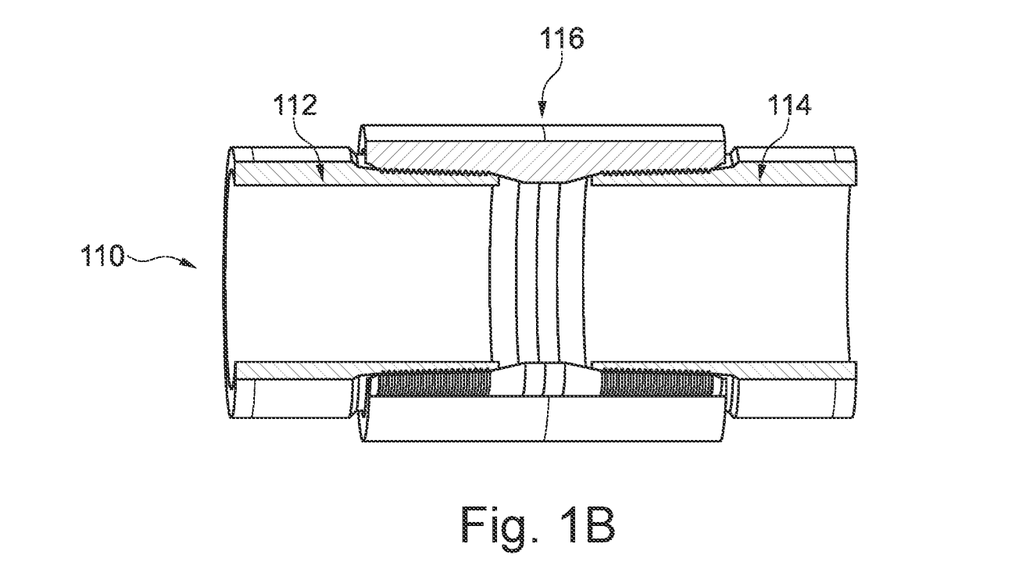
Figure 2:
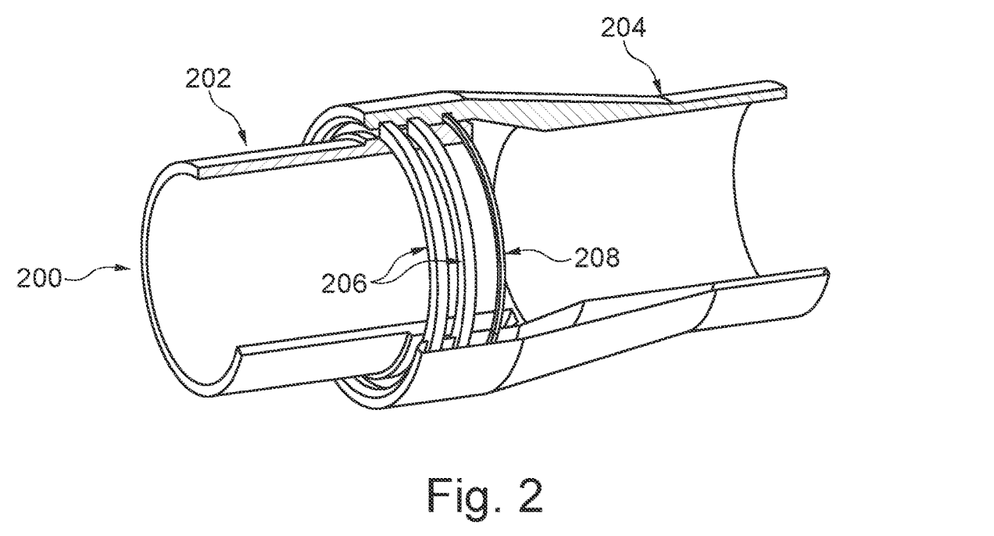
FIG. 2 shows a key-lock joint.

In general, high-pressure RTR pipes make use of interference or mechanical joints (threaded or key-lock joints), while lower pressure ratings can be achieved with adhesive and laminate joints. Examples of interference joints are shown in FIG. 1A, which shows an integral threaded joint, FIG. 1B, which shows a coupled threaded joint, and FIG. 2, which shows a key-lock joint. Referring to FIG. 1A, the joint 100 is formed between a first RTR pipe 102 having a threaded spigot end and a second RTR pipe 104 having a threaded socket end. Referring to FIG. 1B, joint 110 is formed between a first RTR pipe 112 having a threaded spigot end and a second RTR pipe 114 also having a threaded spigot end by employing a coupler pipe 116 having threaded socket ends. Referring to FIG. 2, joint 200 is formed between an RTR pipe 202 having a spigot end and an RTR pipe 204 having a socket end using locking strips 206 and a rubber sealing (O-ring) 208.

SUMMARY OF INVENTION

One or more embodiments of the present invention relate to a system for coupling pipes comprising: a first pipe having a tapered, spigot end; a second pipe having a tapered, spigot end; wherein the first pipe and the second pipe are made from a reinforced thermosetting resin (RTR), and a coupler having two tapered socket ends adapted to internally receive the respective tapered, spigot ends of the first pipe and the second pipe, wherein a thermoplastic material is disposed between an exterior of the first pipe and an interior of the coupler, wherein a thermoplastic material is disposed between an exterior of the second pipe and the interior of the coupler, wherein, upon application of induction heating to the coupler, the heat between the first pipe, the second pipe, and the coupler is sufficient to melt the thermoplastic material such that, when the heat is removed, the hardened thermoplastic material seals the first pipe and the second pipe to the coupler.

One or more embodiments of the present invention relate to a system for coupling pipes comprising: a first pipe having a tapered, spigot end; and a second pipe having a tapered, socket end adapted to internally receive the tapered, spigot end of the first pipe; wherein the first pipe and the second pipe are made from a reinforced thermosetting resin (RTR), wherein a thermoplastic material is disposed between an exterior of the first pipe and an interior of the second pipe, wherein, upon application of induction heating to the coupler, the heat between the first pipe and the second pipe is sufficient to melt the thermoplastic material such that, when the heat is removed, the hardened thermoplastic material seals the first pipe to the second pipe.

One or more embodiments of the present invention relate to a method of coupling a first pipe and a second pipe with a coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, the method comprising: disposing a thermoplastic material between an exterior of the first pipe and an interior of the coupler; disposing a thermoplastic material between an exterior of the second and an interior of the coupler; inserting the first pipe and the second pipe into the coupler; and applying induction heating to the coupler sufficient to melt the thermoplastic material such that, when the heat is removed, the hardened thermoplastic material seals the first pipe and the second pipe to the coupler.

One or more embodiments of the present invention relate to a method of coupling a first pipe and a second pipe, wherein the first pipe and the second pipe are made from a reinforced thermosetting resin (RTR), wherein the first pipe has a tapered, spigot end, wherein the second pipe has a tapered socket end adapted to internally receive the tapered, spigot end of the first pipe, the method comprising: disposing a thermoplastic material between an exterior of the first pipe and an interior of the second pipe; inserting the first pipe into the second pipe; and applying induction heating to the coupler sufficient to melt the thermoplastic material such that, when the heat is removed, the hardened thermoplastic material seals the first pipe to the second pipe.

Other aspects and advantages of the invention will be apparent from the following description and the appended claims.

DETAILED DESCRIPTION

Threaded joints are traditionally used for high pressure RTR pipes. These can be either "integral" (i.e., a connection that does not use a joining member/coupler to transfer the load from one pipe to the other) or using a "coupler." Although threaded joints can achieve outstanding performance, in terms pressure rating and sealing capacity, the experience of O&G operators has shown that failures can happen. The general opinion is that the failures are associated with improper installation by the jointers (pipe misalignment, over-torqueing, improper/insufficient taping of the thread compound—TEFLON® (a trademark of the The Chemours Company FC, LLC), etc.).

Figure 3:
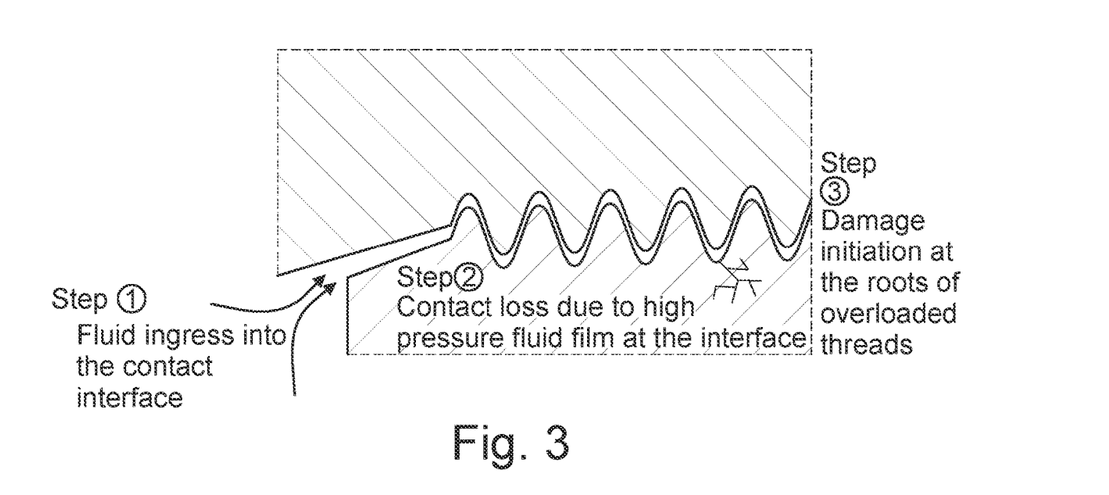
FIG. 3 shows a schematic representation of overloading failure of threaded RTR connections.

A typical failure mechanism is illustrated in FIG. 3. A poor installation can result in imperfections/cavities along the contact surface between the spigot and the socket. In operation, fluid (e.g., water) at high pressure and high temperature could ingress into these cavities (step #1) and create a high pressure fluid film (step #2) which would slowly propagate along the spigot-socket interface. In some cases, the creep of the resin at the interface can aggravate the water propagation at the interface. As the ingress progresses, the contact pressure on the initial threads is eliminated and the excess load is transferred to the nearby threads, which eventually leads to overloading failure (step #3).

One or more embodiments of the present invention introduce a new jointing technique that will reduce, and potentially eliminate, failures and increase the confidence in the RTR pipe technology. The ultimate target for such embodiments is to replace current jointing technologies for RTR pipes (low and high pressure) with a maximum operating envelope up to 24" at 1500 psi pressure rating and service temperatures above 200° F.

Therefore, one or more embodiments of the present invention relate to a system and method for jointing of high pressure reinforced thermosetting resin (RTR) pipes. The innovation combines two conventional jointing techniques: integral threading followed by thermoplastic welding, resulting in threaded-welded joints. More specifically, one or more embodiments of the present invention relate to a system and method for advanced jointing of high pressure reinforced thermosetting resin (RTR) pipes, combining two jointing techniques: integral threading followed by thermoplastic welding. The system comprises (1) a first RTR pipe with a threaded spigot portion coated with a tie layer comprising at least a thermoplastic material (tie layer A) and a (2) a second RTR pipe or RTR coupler with a threaded socket portion coated with a tie layer comprising at least a thermoplastic material (tie layer B). Additionally a method of jointing the RTR pipes consisting of (1) threading the spigot into the socket such as the two tie layers are compressed against each other followed by (2) thermoplastic welding of the two tie layers using induction welding process.

Figure 4:
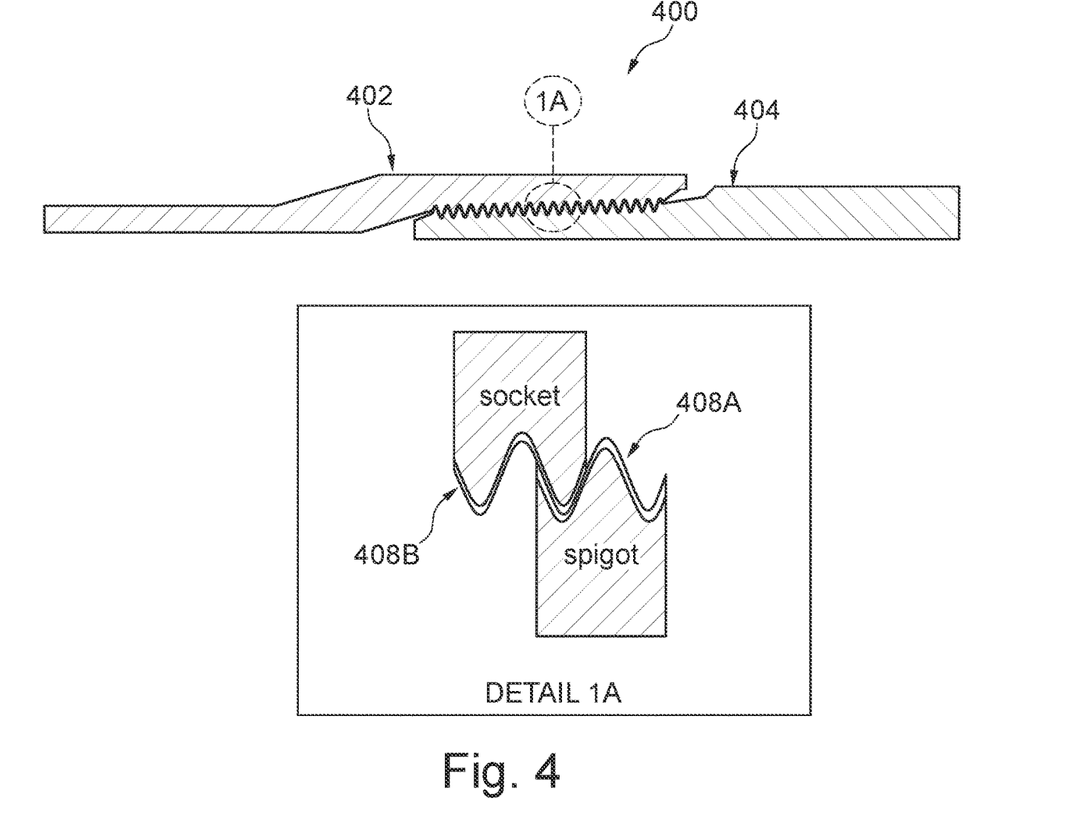
FIG. 4 is a schematic cross-section representation of an integral threaded-welded RTR joint in accordance with one or more embodiments of the invention.

An exemplary system in accordance with one or more embodiments is schematically presented in FIG. 4. As can be seen, the integral threaded-welded RTR joint 400 is being formed between a first RTR pipe 402 with a threaded spigot portion (end) coated with a tie layer comprising at least a thermoplastic material (tie layer A) 408A and a second RTR pipe 404 with a threaded socket portion (end) coated with a tie layer comprising at least a thermoplastic material (tie layer B) 408B.

Figure 5:
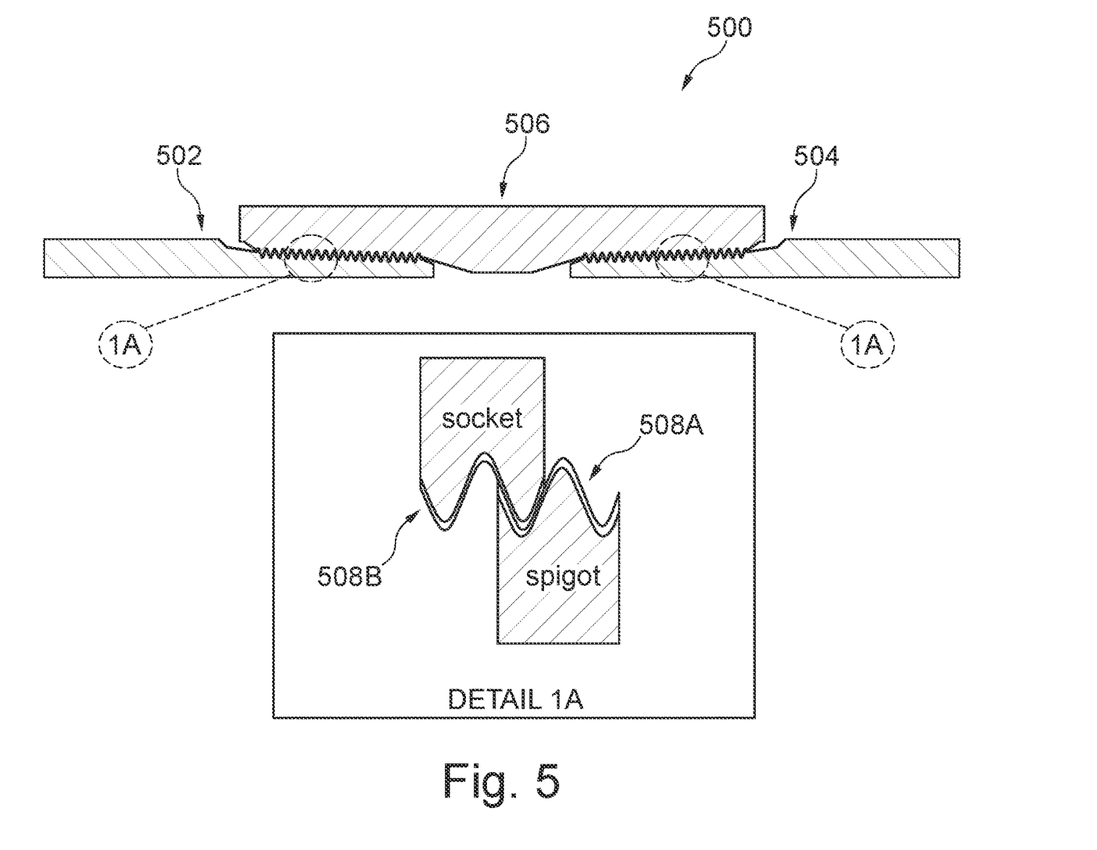
FIG. 5 is a schematic cross-section representation of an coupler threaded-welded RTR joint in accordance with one or more embodiments of the invention.

Another exemplary system in accordance with one or more embodiments is schematically presented in FIG. 5. As can be seen, the coupler threaded-welded RTR joint 500 is being formed between a first RTR pipe 502 with a threaded spigot portion (end) coated with a tie layer comprising at least a thermoplastic material (tie layer A) 508A and a second RTR pipe 504 with a threaded spigot portion (end) coated with the same tie layer as the first RTR pipe (tie layer A) 508A. A coupler pipe 506 with two threaded socket portions (ends) coated with a tie layer comprising at least a thermoplastic material (tie layer B) 508B.

The main role of the tie layers (A and B) is to enable the permanent interlock (by welding) of the spigot and socket after the thread making. This should provide a permanent sealing solution and additional strength to the overall RTR joint. Accordingly, in one or more embodiments, the tie layers are thermoplastic-based. In addition, as most thermoplastics are non-conductive, the tie layers shall also include a susceptor material (e.g., in the form of inclusions) to provide the necessary heat (absorbed during the induction) for the welding of tie layer A to tie layer B. Susceptors are often made of silicon carbide, molybdenum, graphite, stainless steel, aluminum, and other conductive materials.

Those skilled in the art will appreciate various methods can be used to apply and bond the tie layers to the thermoset parts. Several techniques, such as thermal spraying a thermoplastic powder on the faying surface of the thermoset parts (with sufficient surface preparation, e.g., sand blasting) or applying a thermoplastic implant while the thermoset is in a partially cured (or uncured) state, followed by co-curing at the required temperature (below the melting temperature of the thermoplastic) may be employed in different embodiments. In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

The thermoplastic materials 408 used on the tie layers can either be the same or different in A and B, but must necessarily be weldable to each other (e.g., have very close melting/solidification temperatures and be melt compatible, i.e., mix well when molten). In addition, such thermoplastic materials must be carefully selected to ensure their function throughout the lifetime of the pipe (typically, 25 years). For example, the materials must be qualified (e.g., as per ISO 23936) to meet the service specifications in terms of design temperature, pressure and chemical compatibility with the environment (acidic gases, liquids, aromatics contents, etc.). Examples of thermoplastics that can be considered, include but are not limited to (i.e., non-exhaustive list), are HDPE, PE-RT, PVDF, PEEK, PEKK, PA12, POK among other thermoplastic resins commonly used in the O&G industry.

Figure 6:
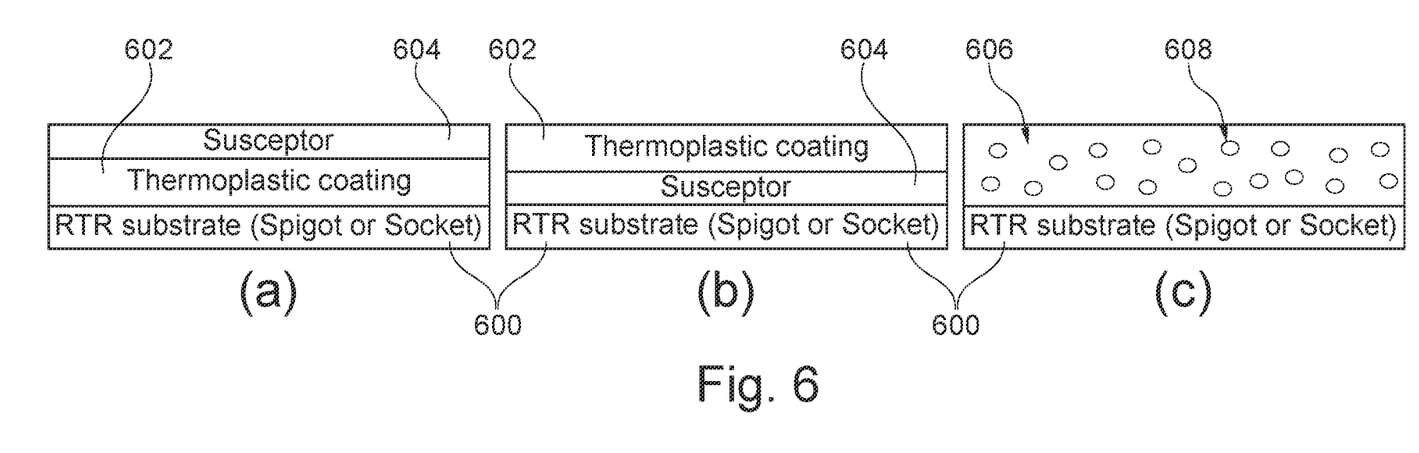
FIG. 6 is a schematic representation of the tie layer deposited on the RTR substrate with a sandwich structure or a mixed matrix-filled structure in accordance with one or more embodiments of the invention.

As schematically presented in FIG. 6, a tie layer is essentially a composite material with either a sandwich structure (i.e., layered) or mixed matrix-filler structure (dispersed). Choosing among the various configurations for the structure of the tie layer, including the tie layer thickness and the volume fraction of each phase in the tie layer, essentially depends on: (1) the coating/deposition process of the tie layer onto the faying surfaces of the RTR pipes, (2) the affinity in terms of maximum bonding strength that can be achieved between the faying RTR surface and the thermoplastic resin or the susceptor material, and (3) the energy required for the induction welding process.

As can be seen, the configuration (a) shown in FIG. 6 includes an RTR substrate (spigot or socket) 600 on which is disposed a thermoplastic coating 602 and susceptor 604. Similarly, the configuration (b) shown in FIG. 6 includes an RTR substrate (spigot or socket) 600 on which is disposed susceptor 604 and a thermoplastic coating 602. However, the order of the layers is reversed between the configuration (a) and the configuration (b). Finally, the configuration (c) shown in FIG. 6 includes an RTR substrate (spigot or socket) 600 on which is disposed a thermoplastic matrix 606 having susceptor fillers/inclusions 608 embedded therein. It is important to note that in configuration (a), the susceptor layer will be at the contact surface between the two tie layers (A and B) and, therefore, a single susceptor could be sufficient. Therefore, the opposite faying surface can simply be made of a pure thermoplastic tie layer (without susceptor).

In one or more embodiments (not represented graphically), a single "thick" thermoplastic inter-layer may be used on one face of the joint only (i.e., either the spigot or the socket) leaving the other side uncoated. Provided that sufficient surface preparation is performed on the uncoated RTR pipe joining (e.g., abrasion), the joining process (induction welding) described below will lead the thermoplastic interlayer to fuse and bond (physically and/or chemically) to the uncoated RTR part. Although this variant eliminates the requirement for coating both sides of the RTR joint, which can be challenging in some circumstances, embodiments employing such a variation may negatively affect performance.

A method of assembling any of the systems described above is illustrated in FIG. 7. These steps follow the standard procedure(s) of threaded RTR joint makeup traditionally provided by RTR joint manufacturers (e.g., NOV-FGS or Future Pipe industries) with exception to step 2 and step 4, which are specific to embodiments of the present invention. It is also worth noting that in step 3, the traditional use of thread compound sealing (e.g., TEFLON®) shall be restricted only to the uncoated sections of the spigot and socket threads.

In one or more embodiments, the deposition of tie layers may be conducted in the factory at the manufacturing stage. Because the surface preparation of a substrate often conditions the final quality of a coating, a clean and controlled environment (e.g., dust free, temperature regulation, etc.) is advantageous, which is easier to achieve in the manufacturing site.

Figure 7:
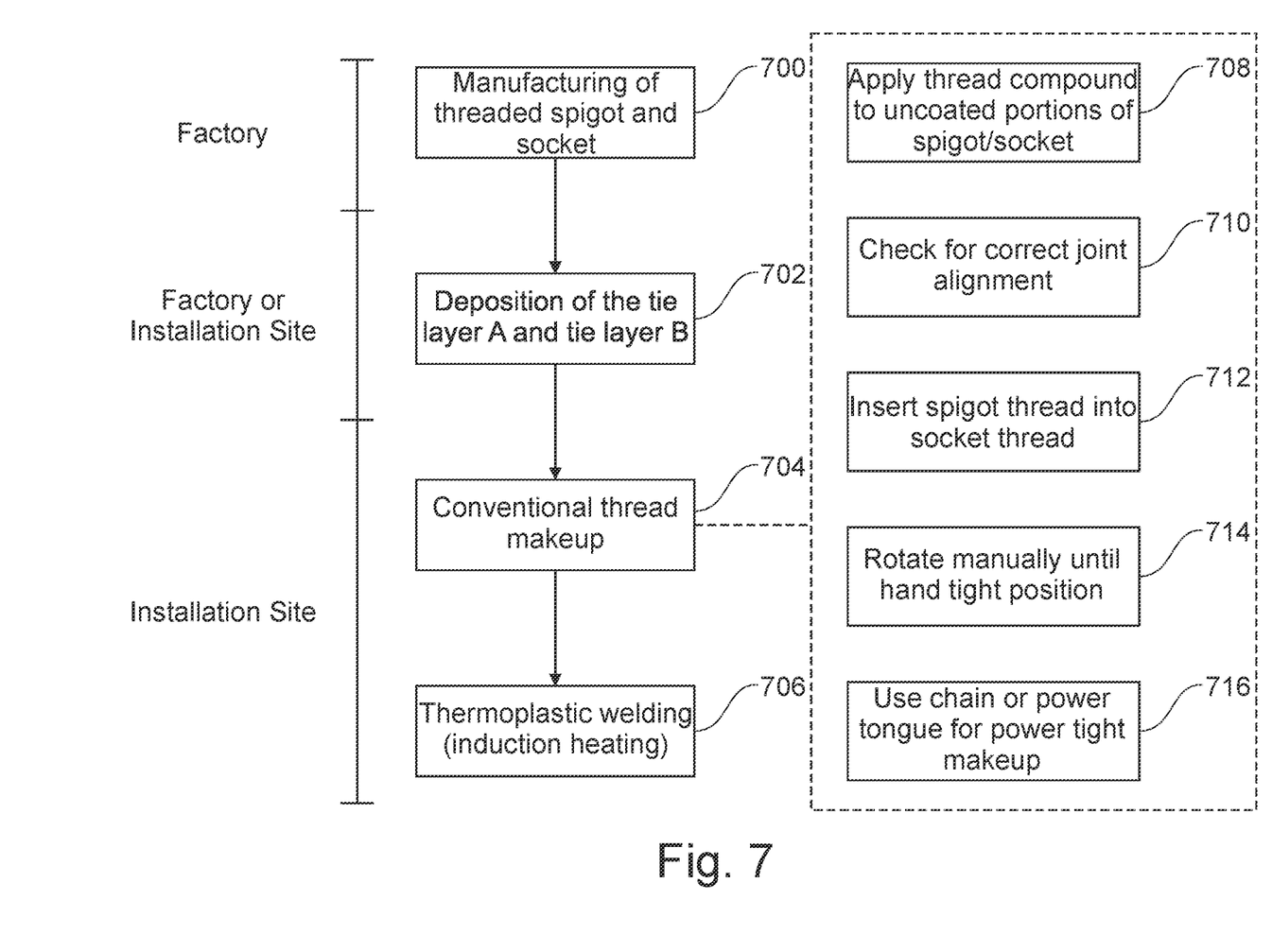
FIG. 7 is an illustration of the steps included in a method in accordance with one or more embodiments of the invention.

Referring to FIG. 7, the first step 700 is manufacturing of the threaded spigot and socket, which occurs in the factory. The next step 702, the deposition of the tie layer A and tie layer B onto the spigot and/or socket occurs. As mentioned above, the deposition step 702 can be performed either in the factory, which is typically advantageous for the reasons mentioned, or at the installation site. In one or more embodiments of the present invention, the deposition may occur at either the factory, installation site, or both. Then, the step 704 of conventional thread makeup occurs. The final step 706, the thermoplastic welding (induction heating), completes the process.

As mentioned previously, those skilled in the art will readily appreciate the conventional thread makeup step 704 includes applying thread compound to the uncoated portions of the spigot and/or socket 708, checking for correct joint alignment 710, inserting the spigot into the socket thread 712, rotating manually until reaching the hand tight position 714, and using chain or power tongue for power tight makeup 716. Because these conventional steps are well-known to those of skill in the art, a discussion of the details of these steps is not included herein.

Figure 8:
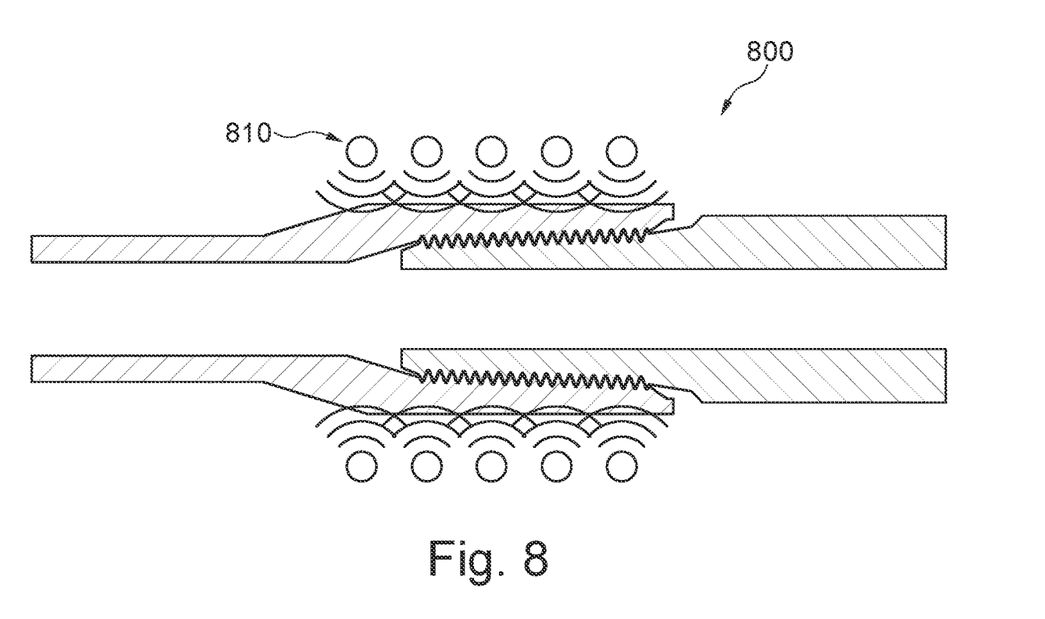
FIG. 8 is an illustration of the induction welding step (step 4 in FIG. 7) after thread makeup in the field.

As schematically shown in FIG. 8, the final step corresponding to thermoplastic welding of the joint 800 after thread makeup can be achieved using conventional induction welding technique. An induction coil 810 is mounted around the threaded joint 800, and induction heating is generated along the spigot-socket thread interface. This will eventually lead to melting, solidification, and complete fusion between tie layers A and B. Those skilled in the art will readily appreciate that the induction welding process parameters (e.g., power, frequency, heating time, etc.) can be properly determined for different situations based on laboratory experiments and numerical simulation results.

Depending on the thermoplastic resin used for the tie layers, a controlled cooling may be required. PEEK, for example, can become very brittle, if the heating/cooling is not controlled. High crystallinity will lead to a more brittle tie-layer. A toughened thermoplastic or elastomer will be more flexible and absorb such local deformation and loadings.

One or more embodiments of the present invention as described above may solve one or more of the following problems or provide one or more of the following advantages.

Systems described herein are advantageous because it is known that the integrity of conventional RTR joints (threaded or adhesive joints) is highly dependent on the skills of the jointer during installation. For example, a joint misalignment, improper application of TEFLON® compound on the threads or excessive torqueing during the joint installation will inevitably impact the interference (contact) pressure between the spigot and socket threads. Further, the degradation of the sealing systems (secondary O-rings) used in some of the joints (e.g., key lock) are known to be the main source of leaks. Thus, the alternative way of joining RTR pipes through a welding process as is described herein simplifies the process and avoids such problems.

One or more embodiments may provide improved sealing and reliability over prior systems. The sealing is entirely provided by the thermoplastic tie layers after welding. In conventional joints, the sealing is provided by a contact pressure (O-ring for key lock-joints or TEFLON® wrap in threaded joints). The contact pressure degrades over time and joints end up leaking. In embodiments of the present invention, the sealing is permanent (welded). In addition, bonding strength is improved by the extra welding step (step 4 in FIG. 8) as compared to that of conventional thread joints.

One or more embodiments may allow for de-skilled installation, as compared to conventional joints, where the quality of the joints often depends on the skills of the jointer (surface treatment, injection of resin, proper application of TEFLON® sealing compound on-site, installation of O-ring, torqueing, etc.). In embodiments of the present invention, the application of the tie layers at the pipe ends can be done at the manufacturing site (controlled production) and the skills required by the jointer at the installation site are reduced. Also, the induction welding process can be fully automated and is relatively fast.

One or more embodiments may provide better tolerance to installation defects, where small imperfections in the thread making step (step 3 in FIG. 7) can potentially be eliminated in step 4 in FIG. 7 during the welding of the thermoplastic tie layers (full melting and solidification of the ties layers). In addition, the inherent ductility of thermoplastic materials (compared to thermosets) is likely to provide some additional tolerance to localized deformations/strains at the spigot/socket contact surface and reduce the likelihood of brittle failure of the thermoset resin due to excessive local deformations.

One or more embodiments may provide increased joint strength provided by a larger joining area (i.e., the length of the coupler) and controlled mainly by the strong bonding between the thermoplastic interlayer to thermoset parts.

One or more embodiments provide versatility. Embodiments of the present invention can be possibly used as a repair technique on faulty threaded joints in the field. The faulty joints must be modified on site to incorporate the tie layers and enable the induction welding process post threading.

Embodiments of the present invention provide a smarter joint, where the (electrically) conductive susceptors (used for the induction welding process) can be used subsequently in an integrity monitoring technology (SHM) for crack detection, such as electrical tomography.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for coupling pipes comprising:
   a first pipe having a tapered, spigot end;
   a second pipe having a tapered, spigot end;
   wherein the first pipe and the second pipe are made from a reinforced thermosetting resin (RTR), and
   a one-piece coupler having two tapered socket ends adapted to internally receive the respective tapered, spigot ends of the first pipe and the second pipe, wherein the tapered, spigot ends of the first pipe and the second pipe are spaced apart from each other after being internally received by the coupler,
   wherein a thermoplastic material is disposed between an exterior of the first pipe and an interior of the coupler,
   wherein a thermoplastic material is disposed between an exterior of the second pipe and the interior of the coupler,
   wherein, upon application of induction heating to the coupler, the heat between the first pipe, the second pipe, and the coupler is sufficient to melt the thermoplastic material such that, when the heat is removed, the hardened thermoplastic material seals the first pipe and the second pipe to the coupler.

2. The system of claim 1, wherein the thermoplastic material comprises a thermoplastic coating and a susceptor.

3. The system of claim 2, wherein the thermoplastic coating is on top of the susceptor.

4. The system of claim 2, wherein the susceptor is on top of the thermoplastic coating.

5. The system of claim 1, wherein at least one of the first pipe, the second pipe, and the coupler is coated with a thermoplastic tie layer.

6. The system of claim 1, wherein all of the first pipe, the second pipe, and the coupler are coated with a thermoplastic tie layer.

7. The system of claim 1, wherein the thermoplastic material comprises a thermoplastic matrix and a susceptor filler is embedded within the thermoplastic matrix.

8. A method of coupling a first pipe and a second pipe with a one-piece coupler, wherein the first pipe and the second pipe are made from a reinforced thermosetting resin (RTR) and each have a tapered, spigot end, wherein the coupler has two tapered socket ends adapted to internally receive the respective tapered, spigot ends of the first pipe and the second pipe, the method comprising:
   disposing a thermoplastic material between an exterior of the first pipe and an interior of the coupler;
   disposing a thermoplastic material between an exterior of the second and an interior of the coupler;
   inserting the first pipe and the second pipe into the coupler, wherein the tapered, spigot ends of the first pipe and the second pipe are spaced apart from each other after insertion into the coupler; and
   applying induction heating to the coupler sufficient to melt the thermoplastic material such that, when the heat is removed, the hardened thermoplastic material seals the first pipe and the second pipe to the coupler.

9. The method of claim 8 further comprising: coating at least one of the first pipe, the second pipe, and the coupler with a thermoplastic tie layer.

10. The method of claim 8 further comprising: coating all of the first pipe, the second pipe, and the coupler with a thermoplastic tie layer.

* * * * *